United States Patent [19]

Dorey

[11] 4,042,929

[45] Aug. 16, 1977

[54] HELICOPTER NAVIGATION SYSTEM

[75] Inventor: Jacques A. Dorey, Combs-la-Ville, France

[73] Assignee: Office National d'Etudes et de Recherches Aerospatiales (O.N.E.R.A.), Chatillon, France

[21] Appl. No.: 571,764

[22] Filed: Apr. 25, 1975

[30] Foreign Application Priority Data

Apr. 26, 1974 France ................................ 74.14671

[51] Int. Cl.² .............................................. G01S 5/02
[52] U.S. Cl. ........................ 343/113 DE; 343/100 PE
[58] Field of Search ................... 343/113 DE, 100 PE

[56] References Cited

U.S. PATENT DOCUMENTS

| | | | |
|---|---|---|---|
| 3,181,159 | 4/1965 | Kramar et al. | 343/113 DE |
| 3,747,105 | 7/1973 | Payne | 343/113 DE |
| 3,787,862 | 1/1974 | Jacobson | 343/113 DE |
| 3,886,555 | 5/1975 | Royal | 343/113 R |

*Primary Examiner*—Maynard R. Wilbur
*Assistant Examiner*—T. M. Blum
*Attorney, Agent, or Firm*—Karl F. Ross; Herbert Dubno

[57] ABSTRACT

In a system for use in helicopter navigation antennas are carried at the free ends of each of the blades of the rotor of the helicopter. Radio waves transmitted by a beacon at a known location on the ground are received by the antennas and phase modulated by their rotation. On the rotor the signals are amplified and mixed with oscillations from local oscillators and are detected with the aid of reference signals from the local oscillators. By means of slip rings and contact brushes the signals are introduced into the body of the helicopter where they are first multiplied with each other and then filtered so as to produce phase-modulated signals with a carrier suppressed which are supplied to an electroluminescent diode illuminating a rotating-disc light modulator with a light-transmitting function which is analogous to the phase modulation of the signals received by the antennas. The light beam passing through the disc is integrated in a vidicon and displayed on a screen.

13 Claims, 3 Drawing Figures

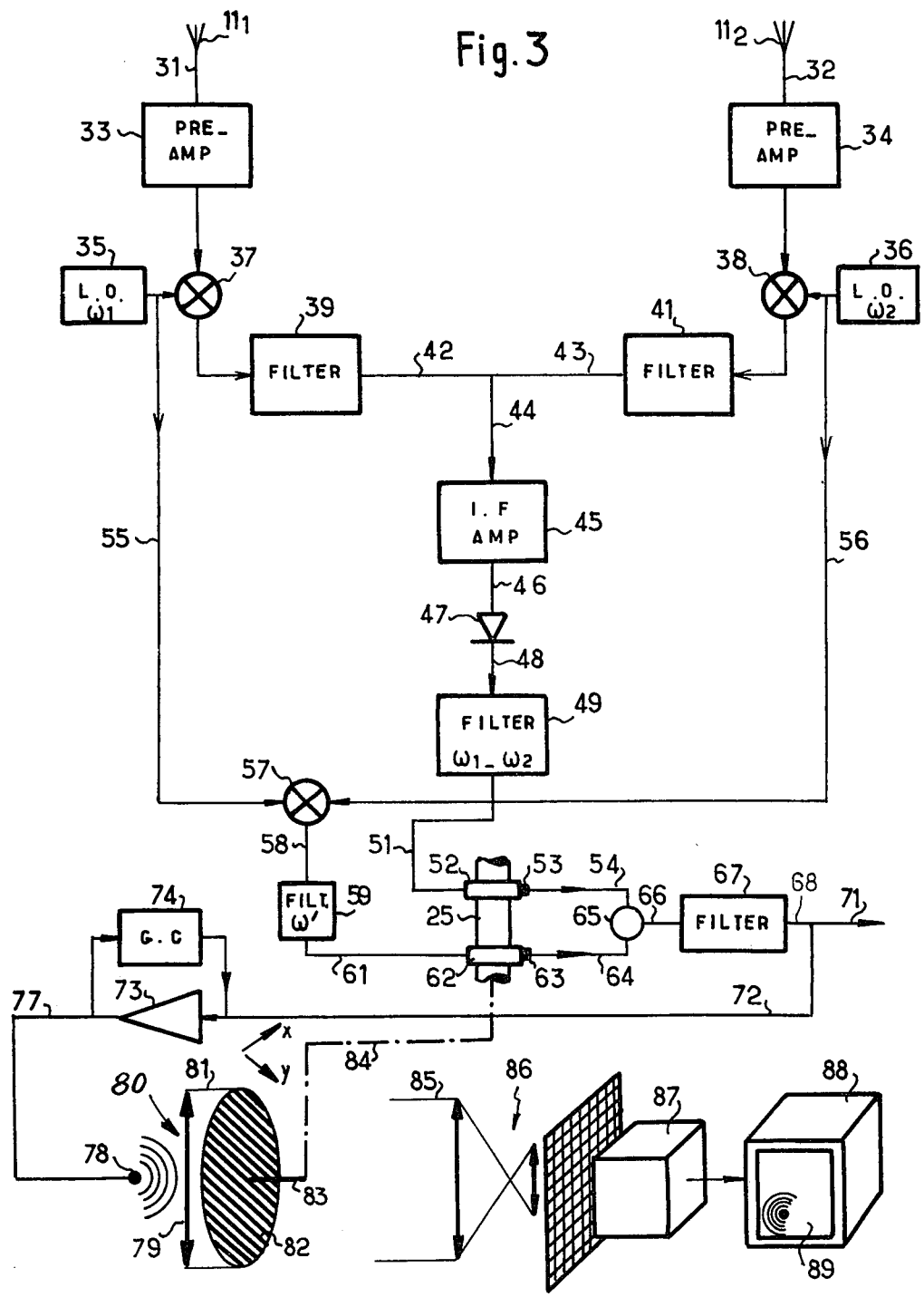

HELICOPTER NAVIGATION SYSTEM

The invention relates to a navigation system for helicopters.

In accordance with my present inventions, the rotor of a helicopter supports receiving antennas for radio-frequency waves from a beacon on the ground, the rotation of the antennas being utilized for determining by the Doppler effect the positional parameters of the helicopter with respect to the beacon. This enables a determination of the position of the helicopter relative to the beacon.

These and other features of my invention will be described in detail with reference to the accompanying drawing, in which:

FIG. 3 is a diagram of the overall equipment of my improved navigation system.

Figure 1:
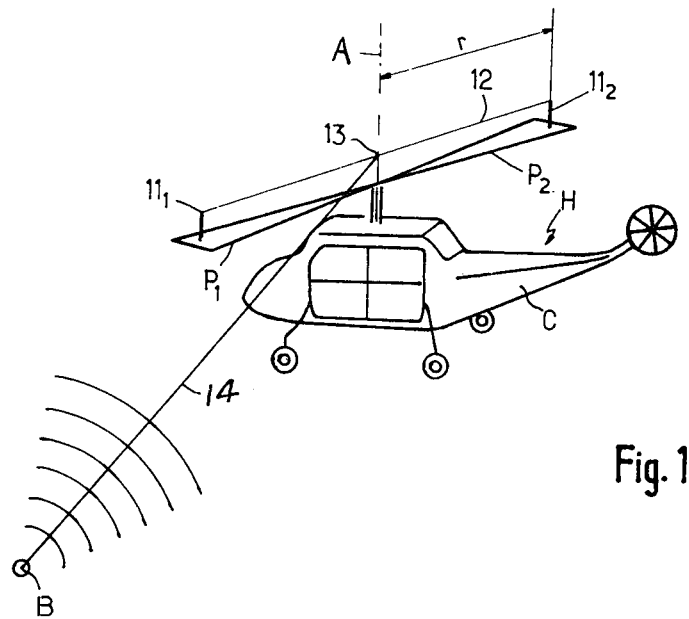
FIG. 1 is a schematic view of a helicopter equipped with antennas on its rotor forming part of a navigation system embodying my invention.

The helicopter H shown in FIG. 1 comprises a body C and a rotor with two diametrically opposite blades $P_1$ and $P_2$, rotating around an axis A.

A first antenna or aerial $11_1$ for receiving electromagnetic waves is disposed on the blade $P_1$ and a second antenna or aerial $11_2$ is disposed on the blade $P_2$. The antennas or aerials are equidistant from the axis of rotation A of the rotor blades; an imaginary connecting line 12 between the antennas passes through the axis A.

The antennas $11_1$ and $11_2$ are advantageously positioned proximate to the free ends of the blades.

The orientation of the antennas is designed to make them insensitive to stray radio waves reflected off the body of the helicopter. For this reason, each antenna comprises a series of dipoles flattened along the center-line of its respective blade.

The body of the helicopter is advantageously covered with a non-reflecting coating, such as a paint or an absorbent material.

A ground radio beacon B at a known location is provided with a transmitter sending out, for example, hyperfrequency radio waves; the signal received by the antenna $11_1$ from the energy sent out by the beacon is of the form $$a_1(t)\cos\left[\omega\left(t - \frac{r}{c}\right) + \psi_1(t) + \phi_1\right] \quad (1)$$

where:
- $a_1$ is the product of the amplitude of the signal transmitted by the beacon B multiplied by the directivity factor of the antenna $11_1$;
- $t$ is the time;
- $\omega$ is the pulsatance of the energy sent out by the beacon B;
- $r$ is the length of the trajectory traversed by the transmitter wave as measured from the beacon B to the center of rotation 13 (i.e., the intersection of the imaginary line 12 with the axis A);
- $c$ is the speed of light;
- $\phi_1$ is an angle relative to a reference phase angle;
- $\psi_1(t)$ is a parameter given by the formula:

$$\psi_1(t) = \frac{2\pi R_1}{\lambda}\cos\phi \cdot \cos(\Omega t - \theta) \quad (2)$$

in which:
- $R_1$ is the radius of rotation of the antenna $11_1$;
- $\lambda$ is the wave length of the frequency of the operating transmitter;
- $\Phi$ is the angle of elevation or inclination of the beacon relative to the plane of rotation of the blades of the rotor;
- $\Omega$ is the angular velocity of the blades;
- $\theta$ is the angle included by an imaginary line 14, extending from the center of rotation 13 to the position of the beacon, with a reference direction of the helicopter passing through the center 13, for example the direction of the longitudinal axis of the body of the helicopter, the values $\Phi$ and $\theta$ being spherical coordinates.

For the antenna $11_2$, the signal received may be expressed by $$a_2(t - \frac{r}{c})\cos\left[\omega(t - \frac{r}{c}) - \psi_2(t) + \phi_2\right] \quad (3)$$

where:
- $\phi_2$ is a phase with respect to a reference value;
- $\psi_2(t)$ is a parameter given by the formula:

$$\psi_2(t) = \frac{2\pi R_2}{\lambda}\cos\Phi \cdot \cos(\Omega t - \theta) \quad (2')$$

in which:
- $R_2$ is the radius of rotation of the antenna $11_2$; the other symbols have the same meaning as in formula (2).

The opposite + and − signs in front of $\psi_1(t)$ and $\psi_2(t)$ in the formulae (2) and (2') correspond to the diametrically oppose positions of the antennas $11_1$ and $11_2$ on the rotor formed by the two blades $P_1$ and $P_2$.

Figure 2:
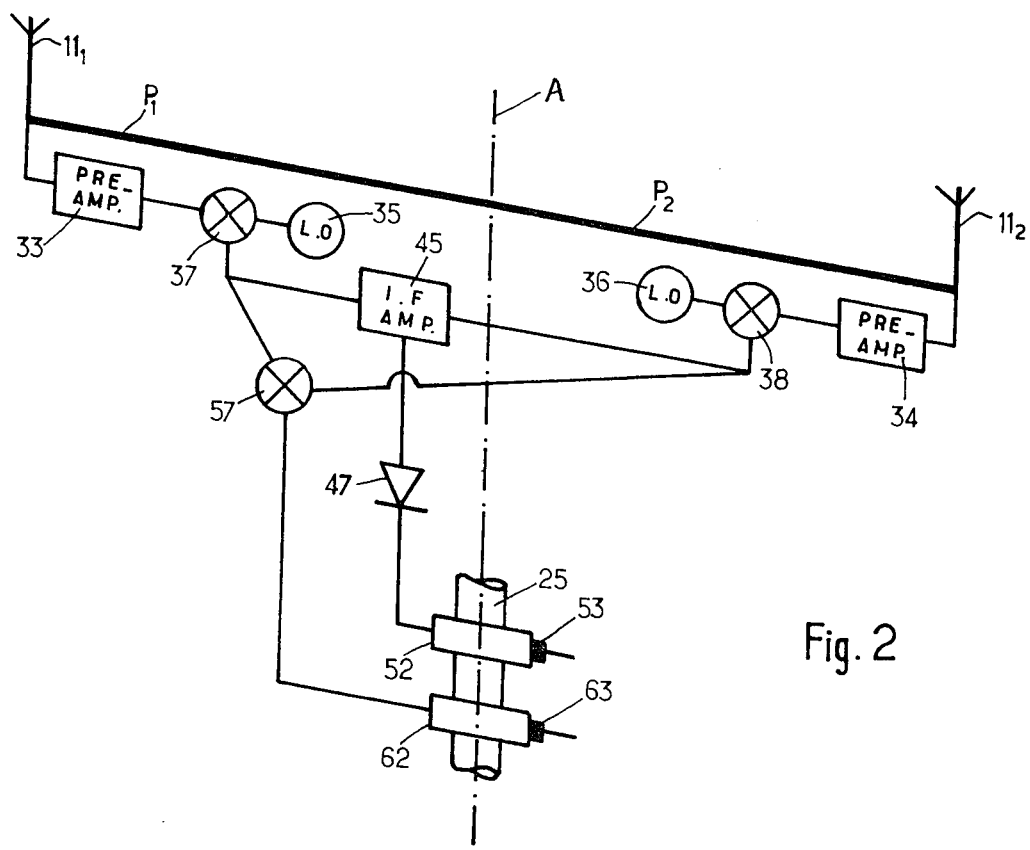
FIG. 2 is a diagram of the receiving and processing equipment on the helicopter rotor.

The signals received by the antennas $11_1$ and $11_2$, respectively, are applied through conductors 31 and 32 (FIGS. 2 and 3) to preamplifiers 33 and 34 carried on the blades $P_1$ and $P_2$, respectively. The blades $P_1$ and $P_2$ also support local oscillators 35 and 36 having pulsatances $\omega_1$ and $\omega_2$, respectively, with phases $\phi'_1$ and $\phi'_2$ with respect to the origin. The signals delivered by a mixer 37, whose input leads receive incoming signals from the preamplifier 33 and heterodyning oscillations from the local oscillator 35, pass through a band-pass filter 39 centered on the frequency difference. Similarly, signals from a mixer 38, whose input leads are connected to the output of the preamplifier 34 and the local oscillator 36, respectively, pass through a band-pass filter 41 centered at the frequency difference. The outputs 42 and 43 of the band-pass filters 39 and 41 are joined at the input 44 of an intermediate frequency amplifier 45. The intermediate frequency signals from the combined output of the band-pass filters 39 and 41 are, after amplification, fed by the output 46 of the i-f amplifier 45 to a nonlinear element, for example a diode 47, which multiplies them with each other. The multiplied signals leaving the diode 47 pass through a filter 49 whose pass-band is centered on the frequency $$\omega' = \omega_1 - \omega_2$$

and has a width sufficient to take into account the maximum deviation of the phase modulation of the two antennas $11_1$ and $11_2$.

The output 51 of filter 49 is connected to a conducting slip ring 52 rotating with a shaft 25 carrying the helicopter rotor; a brush 53 cooperates with this slip ring and is tied to a stationary conductor 54. The signal $s(t)$ carried by the conductor 54, resulting from the nonlinear detection in diode and isolated by the filter 49, is of the form $$s(t) = \Sigma_i a_i^2 \left( t - \frac{r}{c} \right) \cos [\omega' t + \phi' + \phi_1 - \phi_2 + 2\psi_i(t)] \quad (4)$$

where: the subscript $i$ stands for a given trajectory $i$ in a multi-path transmission system in which the energy radiated by the beacon B reaches the antennas $11_1$, $11_2$ along a plurality of such trajectories.

The output leads 55 and 56 of the local oscillators 35 and 36 are also connected to the two inputs of a mixer 57 whose output 58 is connected to a filter 59 having a narrow pass band centered on the frequency difference $\omega'$. The filter 59 is connected through a conductor 61 to a slip ring 62 which is integral with the rotary shaft 25; a brush 63 in friction contact with the ring 62 is tied to a stationary conductor 64.

The signal $r(t)$ carried by the conductor 64 is of the form:

$$r(t) = \cos (\omega' t + \phi') \quad (5)$$

The signals $s(t)$ and $r(t)$ are multiplied in a nonlinear element 65, such as a diode, acting as a detector or demodulator whose output 66 is connected to a low pass filter 67 which eliminates the harmonic $2\omega'$. The signal at the output 68 of the low band-pass filter 67 is of the form:

$$S(t) = \Sigma_i a_i^2 \cos[\phi_2 - \phi_2 + 2\phi_i(t)] \quad (6)$$

Since the filter 67 has eliminated the carrier frequency $2\omega'$, the signal $S(t)$ is a phase modulated signal with a carrier suppressed.

The signal $S(t)$ is supplied by a conductor 72 to an amplifier 73 comprising a gain control 74 by means of which the signal at the output 77 of the amplifier has a constant mean peak value approximating a selected continuous value due to a direct-current component.

The amplified current at the output 77 energizes an electroluminescent diode 78 furnishing a light intensity proportional to the current magnitude. Thanks to the operation of the gain control 74, the voltage supplied to the electroluminiscent diode 78 is never negative and its constant value is not too high as compared with the RMS value of the signal. Elements 78, 79, 82 constitute a signal evaluator generally designated 80.

The electroluminiscent diode 78 is positioned at the focal point of a lens 79 which provides a beam 81 of parallel rays directed toward a disc 82 mounted for rotation about an axis 83. The disc 82 is of variable transparency with a light-transmissivity pattern corresponding to a periodic function in a direction indicated by the arrow $x$ while being of constant transparency in a perpendicular direction indicated by the arrow $y$. Thus, the disc pattern forms a series of parallel lines of alternately high and low light transmissivity.

The disc 82 is rotated about its axis 83, in synchronism with the rotor blades $P_1$ and $P_2$, by a mechanical connection 84 with the shaft 25, indicated schematically, the spindle carrying the disc 82 rotating at the same velocity as the rotor of the helicopter; the disc 82 is so fixed to its spindle that the direction of its parallel pattern lines is perpendicular to the imaginary line 12 extending between the antennas $11_1$ and $11_2$.

The disc 82, acting as a signal converter, may be designed on the basis of interference fringes of a monochromatic light.

The formula defining the transparency of the disc 82 may be written:

$$T(t,\rho',\theta') = 1 + \cos \left[ \phi_0 + \frac{2\pi\rho_0}{\Lambda} \cos(\Omega t - \theta_0) \right] \quad (7)$$

where:
$\phi_0$ is a phase at the origin;
$\rho_0$ and $\theta_0$ are the polar coordinates of a point on the disc in a coordinate system having its origin at the center of the disc;
$\Lambda$ is the spatial wavelength corresponding to the sinusoidal function of the transparency pattern;
$\Omega$ is the angular velocity of the disc which is equal to the angular velocity of the blades of the rotor.

If I is the light intensity produced by the electroluminescent diode 78 and $\chi$ is a control signal represented by the quantity of light coming from the source after passing through the disc 82, we have:

$$\chi = I \cdot T \quad (8)$$

Furthermore $$I = 1 + S(t) \quad (9)$$

where the constant 1 is due to the direct-current component of the output signal of amplifier 73.

Therefore, $$X = \left[ 1 + S(t) \right] \left\{ 1 + \cos \left[ \phi_0 + \frac{2\pi\rho_0}{\Lambda} \cos(\Omega t - \theta_0) \right] \right\} \quad (10)$$

This formula gives the quantity of light at a point in space located in front of the disc 82; the control signal $\chi$ is a function of two mutually conjugate variables, namely the polar coordinates $\rho_0$, $\theta_0$. As shown hereinafter, these two variables are respectively dependent upon the values of $\Phi$ and $\theta$ defining the position of helicopter 4 with reference to beacon B.

The light beam 85 which comes through the disc is projected by a lens system 86 onto integrating display means comprising a photoelectric transducer, specifically a vidicon 87, shown schematically. The vidicon is connected to a display device 88 of the oscilloscope type, with a screen 89.

The product of the two binomials of equation (10) is the sum of four terms which are expressed as follows:

1)      1      (11)

2)
$$\cos\left[\phi_0 + \frac{2\pi\rho_0}{\Lambda}\cos(\Omega t - \theta_0)\right] \quad (12)$$

3) $\quad S(t) \quad (13)$

4)
$$S(t)\cos\left[\phi_0 + \frac{2\pi\rho_0}{\Lambda}\cos(\Omega t - \theta_0)\right] \quad (14)$$

The integration effected by the vidicon 87 over a period of time from $(t-T)$ to $t$ yields the following results:
1. the integration of term (1) give T;
2. the integration of the term (2) produces zero, because the mean value of a sinusoidal signal is zero;
3. the same goes for the integration of the term (3) which is a sum of sine waves whose mean value is zero.

The result of the integration is therefore:

$$J = T + \int_{t-T}^{t} a^2 \cos[\phi_1 - \phi_2 + 2\psi(t)]\cos[\phi_0 + \psi_0(t)] \quad (15)$$

Let $$\psi_0(t) = \frac{2\pi\rho_0}{\Lambda}\cos(\Omega t - \theta_0) \quad (16)$$

Equation (15) may then be broken down as follows:

$$J = T + \tfrac{1}{2}\int_{t-T}^{t} a^2 \cos[\phi_1 - \phi_2 - \phi_0 + 2\psi(t) - \psi_0(t)]dt \quad (17)$$

$$+ \tfrac{1}{2}\int_{t-T}^{t} a^2 \cos[\phi_1 - \phi_2 + \phi_0 + 2\psi(t) + \psi_0(t)]dt$$

The position of the point on the disc 82 with coordinates $\rho_0$ and $\theta_0$ for which the rotation of the disc 82 illuminated by the light produced by the electroluminescent 78 will be devoid substantially free from temporal modulation is that for which $\rho_0$ and $\theta_0$ are solutions of one of the two following groups of equations:

$$\frac{2\pi\rho}{\Lambda} = 2 \cdot \frac{2\pi R}{\lambda}\cos\Phi \quad (18)$$

$$\theta_0 = \theta$$

$$\frac{2\pi\rho_0}{\Lambda} = 2 \cdot \frac{2\pi R}{\lambda}\cos\Phi \quad (19)$$

$$\theta_0 = \theta + \pi$$

Only at the point having polar coordinates, $\rho_0$, $\Theta_0$ and at the point having polar coordinates $\rho_0$, $(\theta_0+\pi)$, representing solutions of the two foregoing groups of equations, will the variation of the disc transparency conform to the variation of the flux; such a correlation between the two variations does not occur for any other point.

The disc 82 offers an infinite number of modulation values with respect to which it is possible to carry out, after processing, a correlation of phase modulations of the signals received.

For the solution corresponding to equation (18), the intensity of the image viewed on the screen 89 for the time of integration T will have a value given by the formula:

$$J_{(\rho_0,\theta_0)} = T + \tfrac{1}{2}\int_{t-T}^{t} a^2(t)\cos(\phi_1 - \phi_2 - \phi_0)dt \quad (20)$$

This may be rewritten:

$$J_{(\rho_0,\theta_0)} = T + \tfrac{1}{2}\cos(\phi_1 - \phi_2 - \phi_0)\int_{t-T}^{t} a^2(t)dt \quad (21)$$

If W be the value of the integral which represents the energy of the signal during a period of time T, equation (21) becomes, aside from a constant:

$$J_{(\rho_0,\theta_0)} = T + \tfrac{1}{2}\cos(\phi_1-\phi_2-\phi_0)W \quad (22)$$

For the solution of equation (19), the corresponding value is:

$$J_{(\pi_0,\theta_0+\pi)} = T + \tfrac{1}{2}\cos(\phi_1-\phi_2+\phi_0)W \quad (23)$$

The ambiguity is removed in favor of observation the signal of formula (22) by so selecting $\phi_1$, $\phi_2$ and $\phi_0$ that the signal of formula (22) is maximized and the signal corresponding to formula (23) is minimized.

The maximizing condition may be written:

$$\cos(\phi_1-\phi_2\phi_0) = 1 \quad (24)$$

whence $$\phi_1-\phi_2-\phi_0 = 0 \quad (25)$$

or $$\phi_0 = \phi_1-\phi_2 \quad (26)$$

The minimizing condition of the second signal may be written:

$$\cos(\phi_1-\phi_2+\phi_0) = 0 \quad (27)$$

whence $$\phi_1-\phi_2+\phi_0 = \pi/2 \quad (28)$$

From equations (26) and (28) we find:

$$2\phi_0 = \pi/2$$

or $$\phi_0 = \pi/4 \quad (29)$$

By substituting in equation (26), we find:

$$\phi_1-\phi_2 = \pi/4 \quad (30)$$

The condition of equation (30) is satisfied by providing coaxial cables or waveguides of different lengths for the conductors 31 and 32 originating at aerials $11_1$ and $11_2$, thereby introducing a quadrature phase difference between the waves respectively received by these aerials.

For the same purpose, it is possible to provide different phase shifts introduced by the mixers 37 and 38.

The condition (29) is satisfied by suitably positioning the axis of rotation 83 with respect to the fringes of the pattern of disc 82.

The viewing device 88 enables the observation, on screen 87, of the angular position of the beacon(s) from which signals are received by the rotating antennas $11_1$ and $11_2$.

This result is obtained even if the rotational velocity of the rotor is not constant.

The mixing of the signals from the two diametrically opposed antennas, equidistant from the axis of rotation of the rotor, causes a phase modulation which is identical with that obtained by means of a single antenna rotating in a circle whose radius is twice as great.

The invention can also be embodied in a system in which the rotor is provided with a number of antennas greater than two.

What I claim is:

1. A navigation system for a helicopter having a body provided with rotor blades turning about an axis of a rotor shaft, comprising:
    two antennas carried by said blades at points remote from said axis for receiving electromagnetic waves radiated by a beacon of predetermined location;
    processing means on said body including two generators of local oscillations, two mixers for respectively heterodyning received waves from said antennas with said local oscillations to produce two intermediate-frequency signals, nonlinear impedance means connected to said mixers for multiplying said intermediate-frequency signals with each other to produce a resulting signal, and detector means connected to said impedance means for deriving a phase-modulated output signal from said resulting signal;
    evaluation means connected to said detector means for correlating said output signal with a set of spatial coordinates; and
    integrating display means connected to said evaluation means for indicating the spatial coordinates associated with said output signal.

2. A navigation system as defined in claim 1 wherein said generators are local oscillators of different operating frequencies.

3. A navigation system as defined in claim 2 wherein said detector means includes a further mixer connected to said local oscillators for deriving therefrom a demodulating frequency constituting the mean of said operating frequencies.

4. A navigation system as defined in claim 3 wherein said mixers and said local oscillators are mounted on said blades, said detector means including a stationary nonlinear element connected to said further mixer and to said nonlinear impedance means through respective slip rings on said rotor shaft.

5. A navigation system as defined in claim 3 wherein said antennas are joined to said two mixers by respective connectors introducing a phaseshift of $\pi/4$ between said received waves.

6. A navigation system as defined in claim 3 wherein said evaluation means comprises a light source connected to said detector means for receiving therefrom said output signal, and a light modulator positioned for illumination by said light source, said light modulator having a light-transmissivity pattern substantially conforming to the phase modulation of said output signal.

7. A navigation system as defined in claim 6 wherein said integrating display means comprises a photoelectric transducer positioned for illumination by way of said light modulator.

8. A navigation system as defined in claim 6 wherein said light modulator comprises a rotatable disc driven by said rotor shaft in synchronism with said rotor blades.

9. A navigation system as defined in claim 8 wherein said disc has a surface divided into a multiplicity of parallel zones whose light transmissivity varies according to a periodic law from one zone to the next while being constant along each zone.

10. An airborne navigation system installed aboard a helicopter for obtaining positional information with reference to a beacon radiating electromagnetic waves, said helicopter having a body provided with rotor blades turning about an axis of a rotor shaft, comprising:
    two antennas carried by said blades at points remote from said axis for receiving electromagnetic waves radiated by said beacon;
    processing means connected to said antennas for deriving from the received waves an output signal with a direct-current component and with a phase modulation due to the rotation of said antennas about said axis;
    evaluation means connected to said processing means for correlating said output signal with a set of spatial coordinates, said evaluation means including a source of light modulated in intensity by said output signal and a rotary light modulator positioned for illumination by light from said source, said light modulator being synchronized with said rotor shaft and having a light-transmissivity pattern substantially conforming to the phase modulation of said output signal; and
    integrating display means connected to said evaluation means for indicating said position-defining values on a two-dimensional luminous field.

11. A navigation system as defined in claim 10 wherein said integrating display means comprises a photoelectric transducer positioned for illumination by said light modulator.

12. A navigation system as defined in claim 11 wherein said light modulator is a rotatable disc driven by said rotor shaft, said disc having a surface divided into a multiplicity of parallel zones whose light transmissivity varies according to a periodic law from one zone to the next while being constant along each zone.

13. A navigation system as defined in claim 10 wherein said processing means has two inputs joined to said antennas by respective connectors introducing a phaseshift between said received waves.

* * * * *